US007035525B2

(12) United States Patent
Weeks et al.

(10) Patent No.: US 7,035,525 B2
(45) Date of Patent: Apr. 25, 2006

(54) METHODS AND APPARATUSES FOR CORRECTING MECHANICAL TWIST IN OPTICAL FIBER

(75) Inventors: Gene Kent Weeks, Duluth, GA (US); Stephen Mast, Norcross, GA (US); Zhi Zhou, Lawrenceville, GA (US); John F. Ryan, III, Duluth, GA (US); Harry Douglas Garner, Jr., Lawrenceville, GA (US); Siu-Ping Hong, Fulton County, GA (US); John Popwell, Gwinnett County, GA (US); Alan H. McCurdy, Fulton County, GA (US)

(73) Assignee: Fitel USA Corp., Norcross, GA (US)

( * ) Notice: Subject to any disclaimer, the term of this patent is extended or adjusted under 35 U.S.C. 154(b) by 271 days.

(21) Appl. No.: 10/255,751

(22) Filed: Sep. 26, 2002

(65) Prior Publication Data

US 2004/0062514 A1 Apr. 1, 2004

(51) Int. Cl.
*G02B 6/00* (2006.01)

(52) U.S. Cl. .............................. 385/147; 57/12; 65/438; 242/472.1; 385/134

(58) Field of Classification Search ................. 65/438; 385/132, 137, 134, 147; 242/472.1; 57/12
See application file for complete search history.

(56) References Cited

U.S. PATENT DOCUMENTS

| 493,683 | A | 3/1893 | Colnon |
| 897,437 | A | 9/1908 | Watson |
| 1,649,495 | A | 11/1927 | Soucy |
| 2,246,066 | A | 6/1941 | Rothe |
| 2,926,426 | A | 3/1960 | Lury |
| 3,807,049 | A | 4/1974 | Zajac |
| 4,092,781 | A | 6/1978 | Blake |
| 4,151,652 | A | 5/1979 | Palma |
| 4,244,107 | A | 1/1981 | Rea |
| 4,644,660 | A | 2/1987 | Mathes |
| 4,972,603 | A | 11/1990 | Meyer |
| 5,298,047 | A | * | 3/1994 | Hart et al. ................... 65/432 |
| 5,418,881 | A | 5/1995 | Hart, Jr. et al. |

(Continued)

FOREIGN PATENT DOCUMENTS

WO    WO02/063354    *  8/2002

OTHER PUBLICATIONS

Schub, et al., "*Polarization Mode Dispersion in Spun Fibers with Different Linear Birefringence and Spinning Parameters*," Journal of Lightwave Technology, vol. 16, No. 9, Sep. 1998, p. 1583-1588.

*Primary Examiner*—John D. Lee
*Assistant Examiner*—James D. Stein
(74) *Attorney, Agent, or Firm*—Sutherland Asbill & Brennan LLP

(57) ABSTRACT

Methods and apparatuses negate a measured mechanical twist of an optical fiber by introducing a counteracting twist to bring the net mechanical twist closer to zero, which reduces the fiber's polarization mode dispersion (PMD). A spool of optical fiber having undesirable mechanical twist is mounted and fiber is drawn from the end of the spool to impart a specified counteracting mechanical twist. Additionally, the spool may be controllably rotated by a control system while optical fiber is drawn there from, allowing the system to generate a precise amount of counteracting mechanical twist in the fiber.

16 Claims, 6 Drawing Sheets

U.S. PATENT DOCUMENTS

| | | |
|---|---|---|
| 5,440,659 A | 8/1995 | Bergano et al. |
| 5,704,960 A * | 1/1998 | Evans et al. .................. 65/402 |
| 6,240,748 B1 | 6/2001 | Henderson et al. |
| 6,837,074 B1 * | 1/2005 | Cocchini et al. ............... 65/382 |
| 2001/0046358 A1 * | 11/2001 | Sasaoka et al. ............. 385/123 |
| 2003/0010066 A1 * | 1/2003 | Sasaoka et al. ............... 65/402 |

* cited by examiner

METHODS AND APPARATUSES FOR CORRECTING MECHANICAL TWIST IN OPTICAL FIBER

FIELD OF THE INVENTION

The present invention relates generally to methods and apparatuses for correcting fiber twist, and more particularly, to methods and apparatuses for correcting mechanical twist in optical fiber to reduce polarization mode dispersion (PMD) and to ensure optical fiber quality.

BACKGROUND OF THE INVENTION

Communications and data transmission systems that transmit information signals in the form of optical pulses over optical fiber are now commonplace, and optical fibers have become the physical transport medium of choice in long distance telephone and data communication networks due to their signal transmission capabilities, which greatly exceed those of mechanical conductors. Despite their advantages, however, difficulties in their manufacture must be overcome in order for high-yield, high-quality and error-free optical fiber to be produced in mass. One such manufacturing problem is mechanical twist.

Mechanical twist of an optical fiber induces PMD, which is undesirable as it negatively impacts the performance of an optical fiber. More specifically, mechanical twist is caused by an external torque placed on the fiber due to misalignment of the draw tower, which causes stress-induced birefringence that increases PMD in a spun optical fiber. Mechanical twist is illustrated in FIG. 1A. As shown in FIG. 1A, mechanical twist, represented by the directional arrow, is caused by an external twisting of the coating 2 of an optical fiber. This twisting causes a non-uniform stress on the glass fiber 4, resulting in increased PMD. Mechanical twist is distinguishable from fiber spin, which is a desirable feature produced by the purposeful rotation of the optical fiber core during manufacture. Fiber spin, illustrated by the directional arrow in FIG. 1B, is induced during formation of the optical fiber 4 by rotating the drawn glass which forms the optical fiber core.

Because mechanical twist is an unwelcome occurrence in the manufacturing process of optical fiber, once mechanical twist is detected optical fiber manufacturing equipment can be adjusted to minimize the degree of mechanical twist imparted to an optical fiber. However, this correction adjustment does not correct optical fiber that has already been created by an imperfect manufacturing process.

Therefore, what is needed is a system, method and apparatus to correct mechanical twist in optical fiber post draw, i.e., after the optical fiber has been manufactured.

BRIEF SUMMARY OF THE INVENTION

Methods and apparatuses of the present invention negate a measured mechanical twist of an optical fiber by introducing a counteracting twist to bring the net mechanical twist closer to zero, which reduces the fiber's polarization mode dispersion (PMD). Briefly, a spool of optical fiber having undesirable mechanical twist is mounted and fiber is drawn from the end of the spool to impart a specified counteracting mechanical twist. Additionally, the spool may be controllably rotated by a control system while optical fiber is drawn there from, allowing the system to generate a precise amount of counteracting mechanical twist in the fiber.

According to one embodiment of the invention there is disclosed a mechanical twist reduction apparatus. The apparatus includes a spool, having a central section and at least one flange end, and a pulling device, for pulling twisted fiber, wrapped around the central section of the spool, from the spool. The pulling device pulls the twisted fiber from the spool over the flange end of the spool, thereby conteracting twist to the twisted fiber.

According to one aspect of the invention, the twisted fiber comprises twisted optical fiber. According to another aspect of the invention, the pulling device pulls the twisted fiber in a direction substantially perpendicular to the direction in which the twisted fiber is wrapped around the central section of the spool. According to yet another aspect of the invention, the spool is secured such that it cannot rotate. According to a further aspect of the invention, the pulling device is operable to impart variable twist to the twisted fiber depending upon the circumference of the spool.

According to one aspect of the invention, the spool may also be rotated as twisted fiber is pulled from the spool by the pulling device. The apparatus may also include at least one motor that rotates the spool as twisted fiber is pulled from the spool by the pulling device. Furthermore, according to one aspect of the invention the at least one motor is operable to rotate the spool in the clockwise and counterclockwise directions. The at least one motor may also be in communication with the at least one pulling device, where the at least one pulling device controls the motor and the speed at which the spool rotates.

According to another aspect of the invention, the mechanical twist reduction apparatus can include a control system operable to control the speed at which the spool rotates. The control system, which may be in electrical communication with the pulling device, is operable to control the speed at which the spool rotates such that the twist imparted to the twisted fiber reduces the twist of the twisted fiber to about zero.

According to another embodiment of the invention, there is disclosed a mechanical twist reduction method. The method includes the steps of wrapping a twisted fiber around a central section of a first spool having at least one flange end, pulling the twisted fiber from the first spool over the flange end of the first spool, thereby imparting counteracting twist to the twisted fiber, wherein the counteracting twist reduces the twist of the twisted fiber, and wrapping the fiber having reduced twist around a second spool.

According to one aspect of the invention, wrapping twisted fiber around a central section of the first spool includes wrapping twisted optical fiber around a central section of the first spool. According to another aspect of the invention, pulling the twisted fiber from the first spool over the flange end of the first spool includes pulling the twisted fiber in a direction substantially perpendicular to the direction in which the twisted fiber is wrapped around the central section of the first spool.

Additionally, according to one aspect of the invention, the first spool may be secured so that it cannot rotate. According to another aspect of the invention, the first spool is rotated as the twisted fiber is pulled from the first spool by a pulling device. The method may also comprise the step of controllably rotating the first spool using at least one motor in communication with the pulling device. Furthermore, the speed at which the first spool rotates may be controlled as the twisting fiber is pulled from the first spool using a control system. Finally, controlling the speed at which the first spool rotates further can further include the step of controlling the speed at which the first spool rotates such that the counteracting twist imparted to the twisted fiber reduces the twist of the twisted fiber to about zero.

BRIEF DESCRIPTION OF THE SEVERAL VIEWS OF THE DRAWING(S)

Having thus described the invention in general terns, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1A:
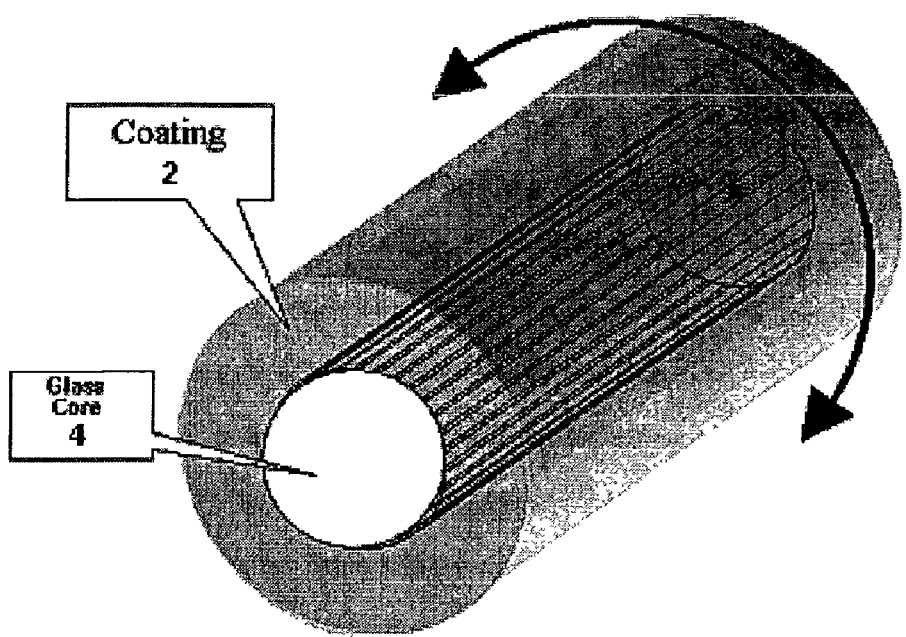
FIG. 1A shows mechanical twist of an optical fiber.
Figure 1B:
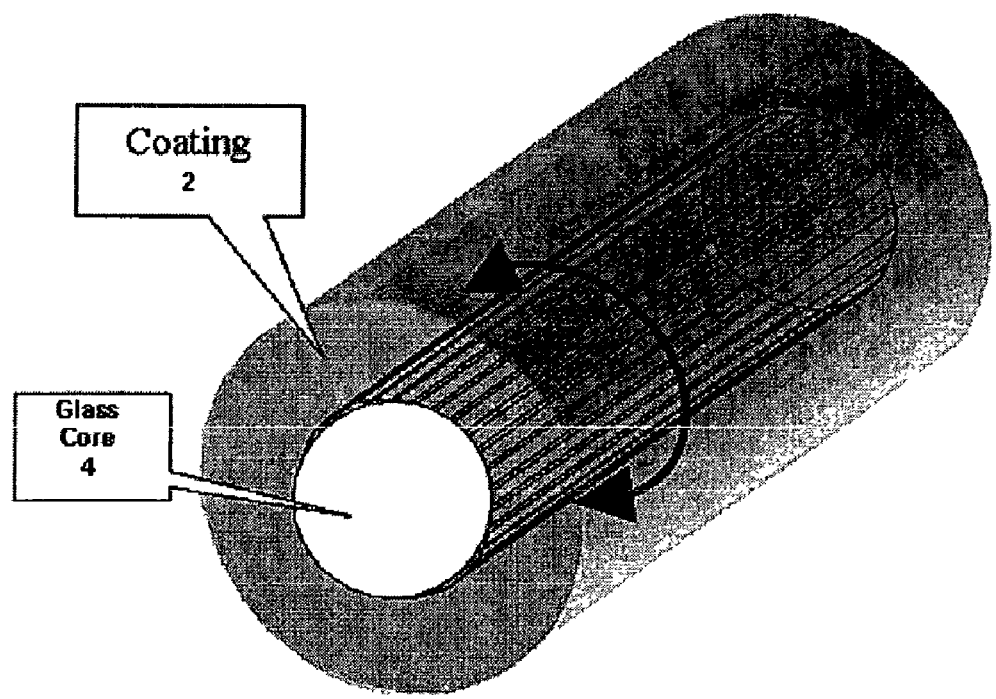
FIG. 1B shows fiber spin of an optical fiber.
Figure 2:
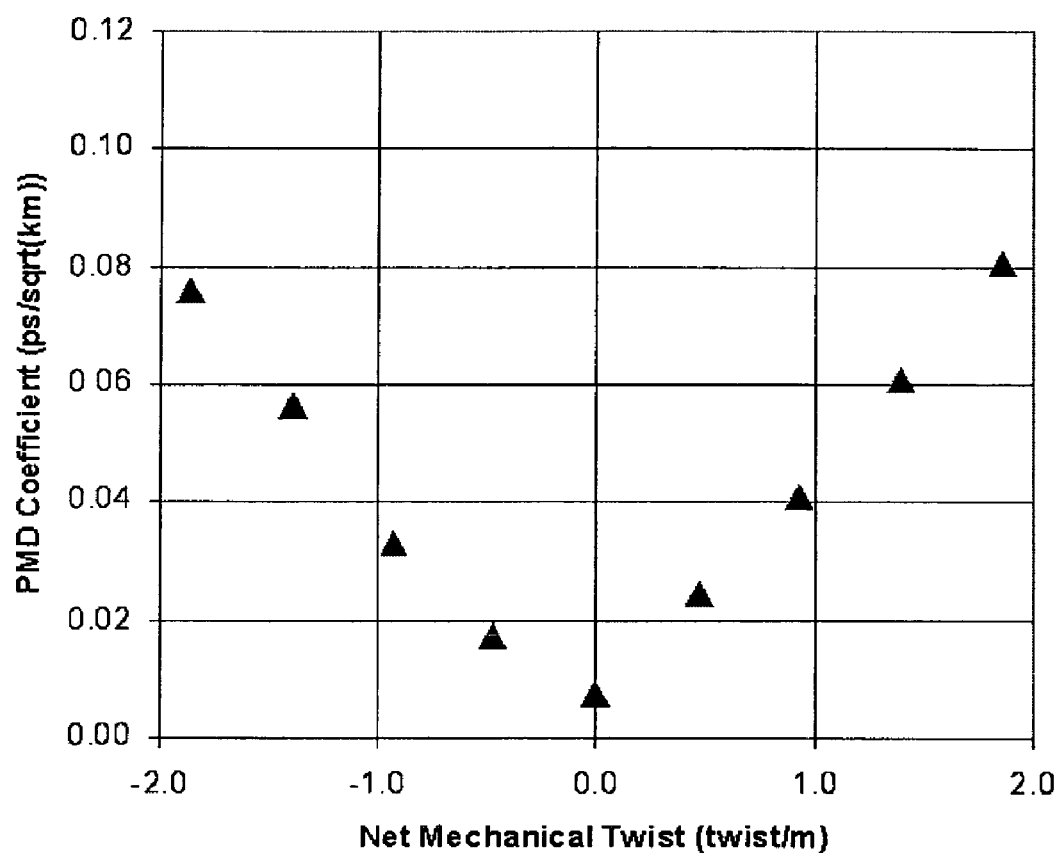
FIG. 2 shows a graph illustrating the impact of mechanical twist on PMD, according to one illustrative example.

As previously discussed, mechanical twist of an optical fiber induces PMD, which negatively impacts the performance of an optical fiber. FIG. 2 shows a graph illustrating the impact of the mechanical twist on an optical fiber's PMD coefficient, according to one illustrative example. As shown in the figure, a net mechanical twist value of zero (0) results in the lowest PMD coefficient, where the mechanical twist value is measured in twists per meter, and the PMD coefficient is measured in picoseconds per $\sqrt{km}$. However, when the twist of the optical fiber deviates from zero (0) the PMD coefficient increases in value. This holds true if the net mechanical twist is positive or negative in value, which corresponds, respectively, to a clockwise and counterclockwise twist of the optical fiber (or vice versa). In the embodiment of FIG. 2, the PMD coefficient is approximately 0.04 per twist per meter, which corresponds to the slope of the lines defined by the PMD coefficients for relative net mechanical twist values.

It will be appreciated by those of ordinary skill in the art that the specific values shown in FIG. 2 are for illustrative purposes only, and that PMD values for a particular optical fiber having varying degrees of mechanical twist will depend upon the characteristics of the optical fiber. Nevertheless, the general proposition signified by FIG. 2, which is that the PMD coefficient for an optical fiber will be at a minimum where the net mechanical twist is zero (0), holds true for conventional optical fiber.

Figure 3:
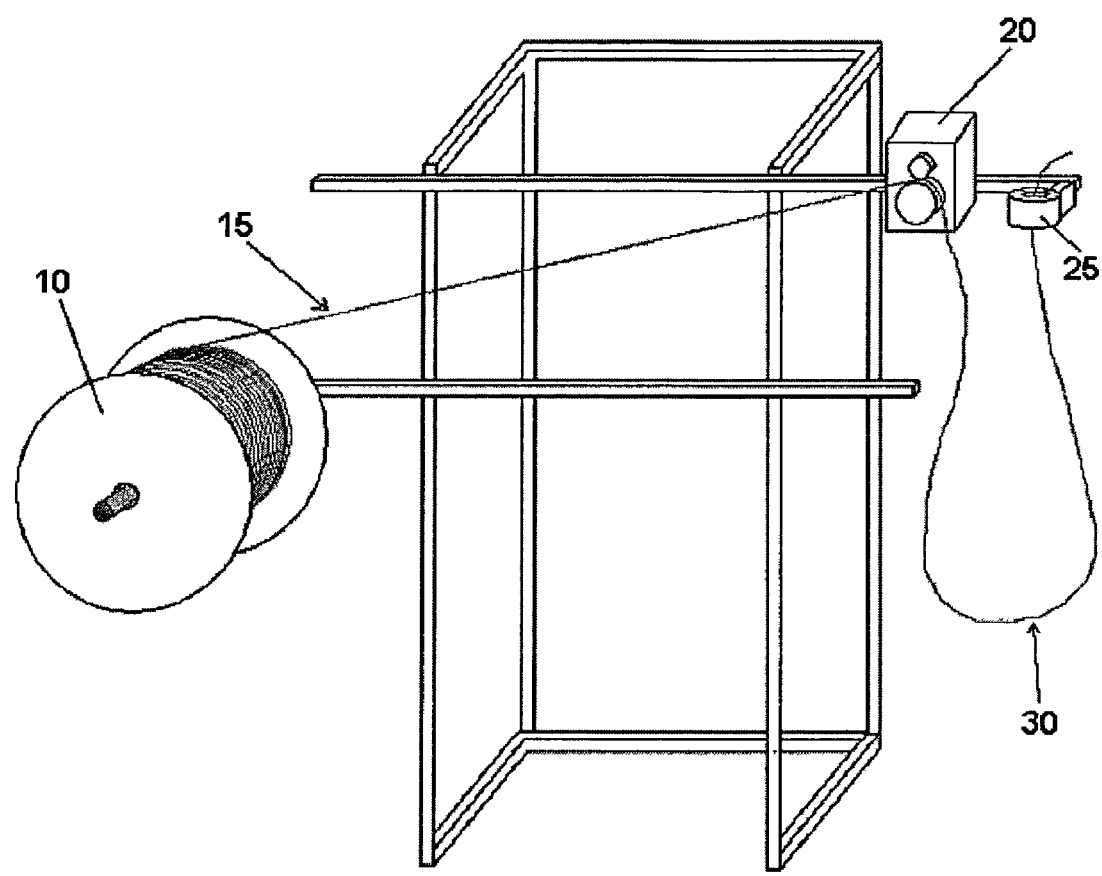
FIG. 3 illustrates a device for measuring the mechanical twist of a drawn optical fiber.

FIG. 3 shows a device for measuring the mechanical twist of each spool of optical fiber generated by a drawing process. Measuring the mechanical twist of each spool can serve two purposes. First, the measured mechanical twist of each spool may be used to adjust the drawing tower such that mechanical twist of later-manufactured optical fiber is close to zero. Secondly, the measured mechanical twist is used by the systems, apparatuses and methods of the present invention to correct unwanted mechanical twist of a fiber to zero post-draw.

As shown in FIG. 3, a spool 10 of optical fiber 15 is rotatably mounted on a post in a horizontal position such that the optical fiber 15 may be continuously pulled from the top or bottom of the spool 10 as the spool 10 rotates. The optical fiber 15 is threaded through a fiber payout device 20, which uses one or more revolving wheels to measure the length of optical fiber 15 passing there through. The end of the optical fiber 15 is then secured to a rotatable chuck device 25 and a length of fiber, such as 2 meters in length, is fed through the fiber payout device 20 to form a fiber loop 30 located in between the fiber payout device 20 and the rotatable chuck device 25. It will be appreciated that because the end of the optical fiber 15 relaxes or unwinds by itself on the spool 10 before it is secured to the rotatable chuck device 25, a length of fiber, such as 7–10 meters, is preferably removed from the spool 10 prior to securing the end of the fiber 15 to the chuck device 25.

Once the end of the fiber 15 is secured to the chuck device 25 and a fiber loop 30 is produced, the loop 30 is examined to determine whether there is mechanical twist present in the fiber 15. If there is no mechanical twist in the optical fiber 15, the fiber loop 30 will hang loosely, with no inclination to twisting relative to itself or about a vertical axis. However, where mechanical twist is present the optical fiber loop 30 will not hang freely, as tension in the loop will cause the loop 30 to bend or coil in a clockwise or counterclockwise fashion about a vertical axis. This twist is analogous to the manner in which a telephone cord will twist upon itself when one the end of the telephone cord fixed to a telephone base and the other end, which is attached to the handset, is spun in a clockwise or counterclockwise direction.

The presence or absence of mechanical twist is ascertained by a visual inspection of the fiber loop 30. After the presence of mechanical twist is confirmed, the mechanical twist, measured in turns per meter, is measured using the chuck device 25. In particular, the chuck device 25, to which the end the fiber 15 is secured, is rotated to counteract the effect of the twist in the fiber loop 30. Essentially, the chuck device is turned in the opposite direction of the twist in the fiber loop 30 until the fiber loop 30 hangs loosely and is void of any twist. During this process the total number of turns of the rotatable chuck device 25, measured in whole and fractional turns, is recorded. Using the total number of turns of the chuck device 25 and the length of the fiber loop 30 measured by the fiber payout device 20, the mechanical twist may be calculated:

$$\text{Mechanical Twist (turns/m)} = \frac{\text{Number of turns to release twist}}{\text{Length of fiber loop (m)}}$$

To account for variability of mechanical twist and possible operator error, a plurality of such measurements are preferably made for each spool and averaged together to give a final twist measurement for each spool. According to one preferred embodiment, at least three (3) such measurements each separated by 7–10 meters are made and averaged. Once the mechanical twist is measured, apparatuses and methods of the present invention controllably untwist the unwelcome mechanical twist of the optical fiber.

Figure 4:
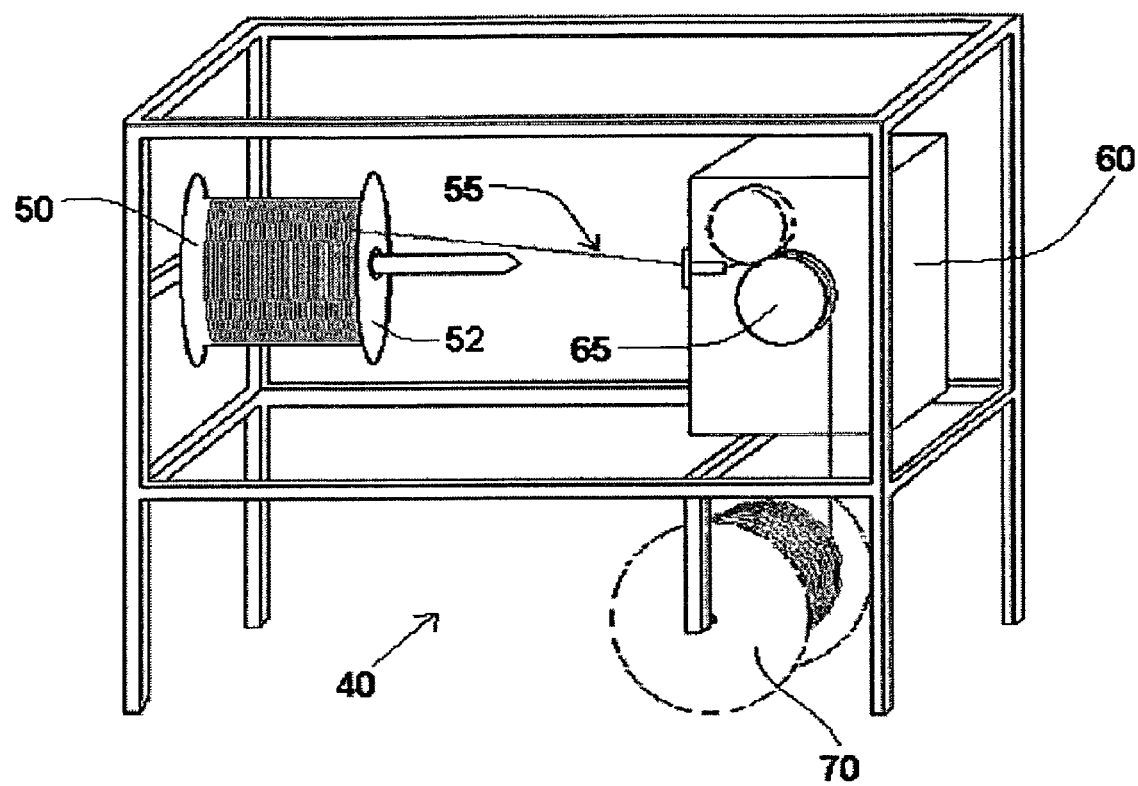
FIG. 4 shows an apparatus to effect passive untwisting, according to one embodiment of the present invention.

FIG. 4 shows an apparatus 40 to effect passive untwisting, according to one embodiment of the present invention. As shown in FIG. 4, the spool 50 (the pay-out end) of twisted optical fiber 55 is mounted on a post such that the end of the spool faces, and the spool's center axis intersects, a passive untwisting device 60. According to one aspect of the invention, the spool 50 is fixed so that it cannot rotate. The apparatus 40 effects untwisting of the twisted fiber by pulling the twisted optical fiber 55 from the flange end 52 of the spool 50 and winding it onto another spool 70 (the take-in end). The untwisting device 60 includes a motor and at least one wheel 65 for pulling the fiber 55 from the spool 50. Mechanical twist is imparted to the fiber 55 as the fiber 55 is pulled over the end 52 of the spool 50. This twist is naturally generated as the fiber 55 is pulled over the flange end 50 due to the orientation of the spool 50 and passive untwisting device 60. This twist counters or subtracts from the unwanted mechanical twist to bring the net mechanical twist closer to zero (0). For instance, where a particular length of optical fiber has a measured mechanical twist of 2, which corresponds to 2 clockwise twists over its length, the apparatus 40 of the present invention can introduce 2 counterclockwise twists to effectively negate the measured mechanical twist. According to one aspect of the invention, the apparatus 40 may be incorporated into the fiber manufacturing process, as it effects rewinding of the fiber 55.

Figure 5:
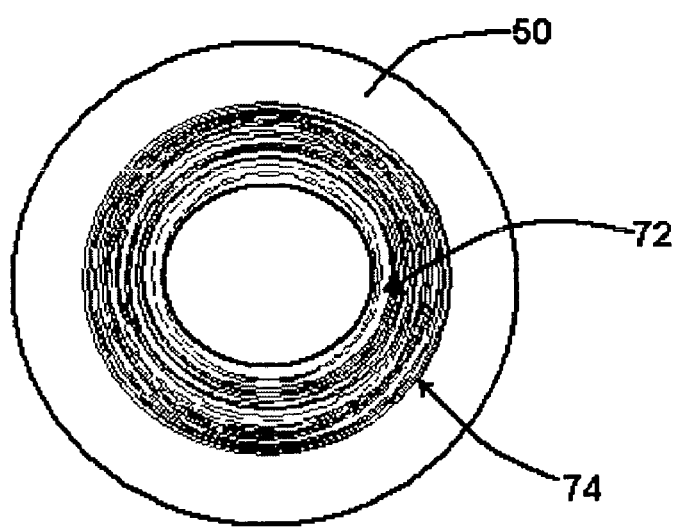
FIG. 5 shows a cross-section of a spool having twisted fiber wound thereon, according to one illustrative example.

The number of twists imparted to the fiber 55 is dependant upon the circumference of the spool 50, as one turn of mechanical twist is imparted for each length of optical fiber 55 corresponding to one spool 50 revolution. Therefore, as optical fiber 55 is removed from the spool 50, the length of optical fiber 55 associated with one spool revolution gradually decreases. This is illustrated in FIG. 5, which shows a cross-section of a spool 50 having twisted optical fiber wound thereon. As the apparatus 40 removes optical fiber, the circumference of the wound optical fiber will gradually decrease from the fiber circumference shown at reference 74 to the fiber circumference shown at reference 72. Therefore, the amount of twist imparted to twisted optical fiber wound on the spool 50 is not uniform along the length of the fiber, as greater twist is imparted for optical fiber 55 closest to the center of the spool 50 than for optical fiber 55 closer to the outside of the spool 50.

Figure 6:
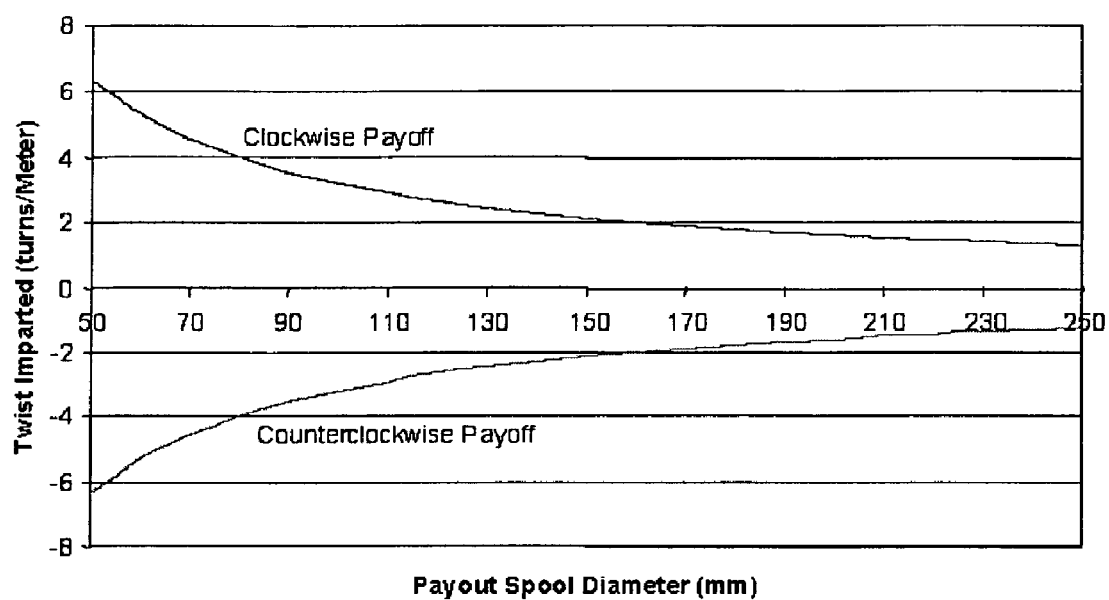
FIG. 6 is a graph illustrating the twist imparted to optical fiber on various diameter spools using passive untwisting to counteract unwanted mechanical twist of a drawn optical fiber, according to one embodiment of the present invention.

Using the apparatus of FIG. 4, it will be appreciated that the amount of twist imparted depends on the spool 50, and not the optical fiber 55. FIG. 6 shows the relationship of the amount of twist imparted, in terms of turns per meter, for varying spool 50 diameters, measured in millimeters (mm). The graph shows that the same amount of twist will be imparted whether the fiber 55 is removed from the spool 50 in a clockwise and counterclockwise manner (illustrated as the clockwise payoff and counterclockwise payoff, respectively). As can be appreciated with reference to FIG. 6, to precisely control the amount of twist correction per unit length, the spool diameter may be increased or decreased. Therefore, according to one aspect of the present invention the additional step of transferring the twisted optical fiber 55 from a first spool to a second spool of a different size can occur prior to mounting the second spool on the apparatus of FIG. 4.

Figure 7:
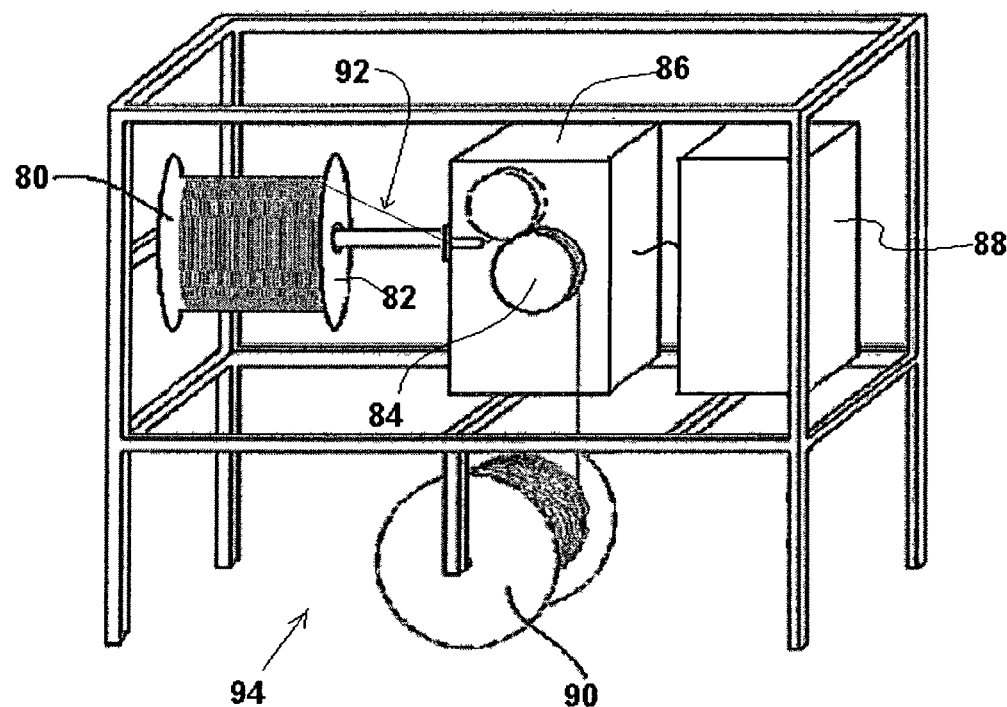
FIG. 7 shows an apparatus to effect active fiber untwisting, according to one embodiment of the present invention.

FIG. 7 shows an apparatus 94 to effect active fiber untwisting, according to another embodiment of the present invention. The method of active fiber untwisting utilizes rotation of the payout spool 80 while optical fiber 92 is pulled over the flange end 82 of the payout spool 80 by one or more wheels 84 associated with an active untwisting device 86. In contrast to the method and apparatus described with respect to FIG. 4, in which the spool 50 is fixed in position, facilitating a controlled rotation of the payout spool 80 allows with apparatus 94 to accurately neutralize unwanted twist in optical fiber 92 regardless of the thickness of a particular spool or the amount of fiber drawn from a spool. Despite this difference, like the apparatus 40 of FIG. 4, twist is induced to the optical fiber 92 to effectively negate the net mechanical twist of the fiber, and the resultant untwisted optical fiber 92 is wound onto a new take-in spool 90.

As explained above with reference to FIG. 4, if the spool is fixed one turn of mechanical twist is imparted for each length of optical fiber 55 corresponding to one spool 50 revolution. However, using the apparatus 94 of FIG. 7 and an identically-sized spool and fixed position from which the fiber is pulled from the spool, if the optical fiber is drawn in a clockwise fashion while the spool rotates in the clockwise direction, less twist will be imparted into the optical fiber. On the other hand, if the optical fiber is drawn in a clockwise fashion while the spool rotates in the counterclockwise direction, greater twist will be imparted into the optical fiber.

The active untwisting device 86 controls the rotation speed of the spool, either through direct mechanical control of the spool mounting (e.g., the post upon which the spool is mounted), or through electrical signals that instruct a separate motor which controls the rotation speed of the payout spool 80. The active untwisting device 86 is preferably coupled to at least one machine control system 88 to neutralize the mechanical twist of an optical fiber 92 to near zero. According to one aspect of the invention, the at least one machine control system 88 is in electrical communication with the active untwisting device 86, as illustrated in FIG. 7 by the electrical connection connecting the components. Although the machine control system 88 is illustrated as comprising a portion of the apparatus 94 of FIG. 7, it should be appreciated that the machine control system 88 may be in remote communication with the active twisting device 86. Additionally, the machine control system 88 can comprise, according to one aspect of the present invention, a computer control system in electrical communication with the active twisting device 86. Because the basic concepts of computer control systems are well known in the art, the details of such systems are not discussed herein. However, the machine control system 88 enables a user or automated system to enter the amount of measured twist of an optical fiber, and the spool diameter upon which the optical fiber is wound. The control system 88 can then communicate the rotational speed at which the active untwisting device should maintain the spool to ensure an appropriate level of countertwist to negate the undesired mechanical twist, as is explained in greater detail below. It will be appreciated that the active twisting device 86 and machine control system 88 may be combined in one element though they are shown as distinct devices in the embodiment illustrated in FIG. 7. Likewise, where the device 86 and system 88 are separate elements they may be physically located near or far from each other.

It will be appreciated that the payout spool 80 may be rotated in either a clockwise or counterclockwise direction while the active twisting device 86 pulls optical fiber 92 from the end flange 82 of the spool 80 to increase or decrease the amount of twist imparted to the optical fiber 92. By controlling the speed of rotation, the amount of twist can be precisely controlled regardless of, e.g., the diameter of the spool. Referring again to FIG. 5, for instance, the apparatus 94 can slowly increase the spool rotations per minute (rpm), from zero, in a counterclockwise direction where optical fiber is removed in a clockwise fashion, such that the net twist imparted to the fiber remains constant as the wound optical fiber circumference changes from reference 74 to reference 72. Therefore, the varying mechanical twist illustrated by the curved lines of FIG. 6, for example, may be avoided.

Figure 8:
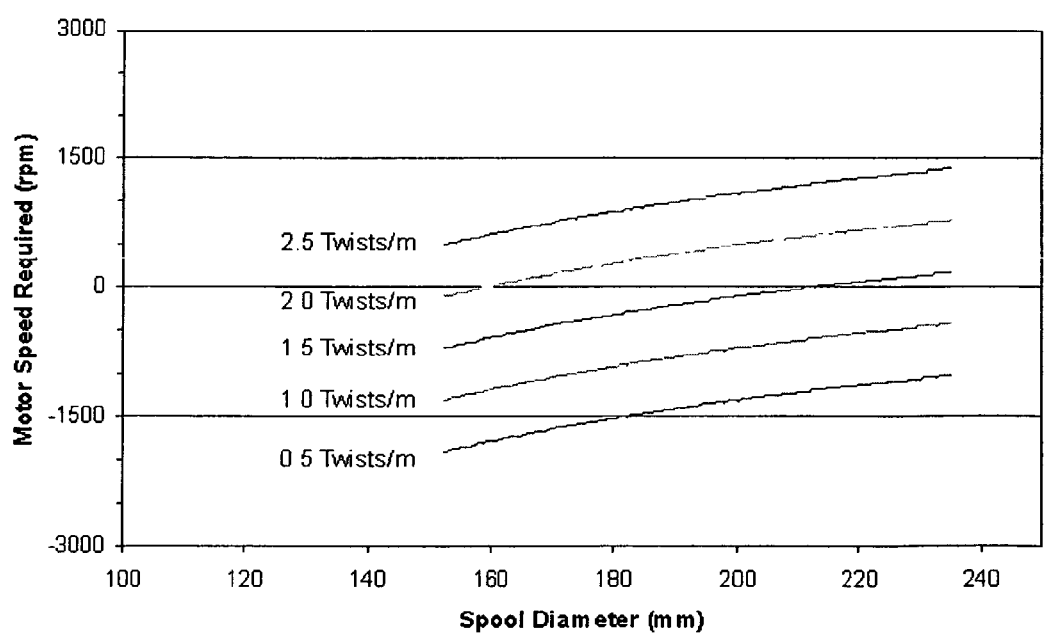
FIG. 8 is a graph illustrating the twist imparted to optical fiber for various diameter spools and spool rotation speeds using active fiber untwisting, according to one embodiment of the present invention.

FIG. 8 is a graph illustrating the twist imparted to optical fiber for various diameter spools and spool rotation speeds using active fiber untwisting, according to one embodiment of the present invention. More particularly, the graph shows the number of twists that may be imparted to an optical fiber for a particular spool diameter and spool rotation speed, as measured in rpm. The multiple curved lines in the graph illustrate spool diameters and motor speeds to effect 0.5, 1, 1.5, 2 and 2.5 twists/m of an optical fiber. The net mechanical twist illustrated in FIG. 8 and imparted to a spool using the apparatus 94 of FIG. 7 is represented by the following equation:

$$MotorSpeed \text{ (rpm)} = \left[ (\text{No. of twists/m}) - \frac{1}{\pi \cdot \text{Spool Diameter (m)}} \right] * Linespeed \text{ (m/min)}$$

Where the motor speed is equal to the rpm at which the payout spool 80 rotates, the number of twists per meter is the amount of twist imparted to the optical fiber 92 by the apparatus 94, and the linespeed is the speed at which the optical fiber 92 is pulled by the active twisting device 86 from the flange 82 of the spool 80. According to one aspect of the invention, the machine control system 88 and/or active twisting device 86 is used to calculate the payout spool 80 rpm to maintain a desired twist such that the net mechanical twist of the optical fiber ultimately reaches (or comes close to) zero.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A mechanical twist reduction system, comprising:
   a spool, comprising a central section and at least one flange end;
   a fiber payout device operable to facilitate the measurement of the twist of a twisted fiber wrapped around the central section of the spool;
   a pulling device, for pulling the twisted fiber, from the spool; and
   a motor, wherein the motor is operable to rotate the spool, wherein the pulling device pulls the twisted fiber from the spool over the flange end of the spool as the motor rotates the spool, thereby imparting counteracting twist to the twisted fiber, and wherein the counteracting twist reduces the twist of the twisted fiber.

2. The mechanical twist reduction apparatus of claim 1, wherein the twisted fiber comprises twisted optical fiber.

3. The mechanical twist reduction apparatus of claim 1, wherein the pulling device pulls the twisted fiber in a direction substantially perpendicular to the direction in which the twisted fiber is wrapped around the central section of the spool.

4. The mechanical twist reduction apparatus of claim 1, wherein the pulling device is operable to impart variable counteracting twist to the twisted fiber depending upon the circumference of the spool.

5. The mechanical twist reduction apparatus of claim 1, wherein the at least one motor is operable to rotate the spool in the clockwise and counterclockwise directions.

6. The mechanical twist reduction apparatus of claim 1, wherein the at least one motor is in communication with the at least one pulling device, and wherein the at least one pulling device controls the motor and the speed at which the spool rotates.

7. The mechanical twist reduction apparatus of claim 1, further comprising a control system, wherein the control system is operable to control the speed at which the spool rotates.

8. The mechanical twist reduction apparatus of claim 7, wherein the control system is in electrical communication with the pulling device.

9. The mechanical twist reduction apparatus of claim 7, wherein the control system is operable to control the speed at which the spool rotates such that the counteracting twist imparted to the twisted fiber reduces the twist of the twisted fiber to about zero.

10. A mechanical twist reduction method, comprising:
    wrapping a twisted fiber around a central section of a first spool having at least one flange end;
    measuring the twist of the twisted fiber using at least one fiber payout device;
    rotating the first spool using at least one motor;
    pulling the twisted fiber from the first spool over the flange end of the first spool, thereby imparting counteracting twist to the twisted fiber, wherein the counteracting twist reduces the twist of the twisted fiber; and
    wrapping the fiber having reduced twist around a second spool.

11. The mechanical twist reduction method of claim 10, wherein wrapping twisted fiber around a central section of the first spool comprises wrapping twisted optical fiber around a central section of the first spool.

12. The mechanical twist reduction method of claim 10, wherein pulling the twisted fiber from the first spool over the flange end of the first spool comprises pulling the twisted fiber in a direction substantially perpendicular to the direction in which the twisted fiber is wrapped around the central section of the first spool.

13. The mechanical twist reduction method of claim 12, further comprising the step of securing the second spool so that it cannot rotate.

14. The mechanical twist reduction method of claim 10, further comprising the step of controllably rotating the first spool using at least one motors, wherein the at least one motor is in communication with the pulling device.

15. The mechanical twist reduction method of claim 14, further comprising the step of controlling the speed at which the first spool rotates, using a control system, as the twisting fiber is pulled from the first spool.

16. The mechanical twist reduction method of claim 15, wherein the step of controlling the speed at which the first spool rotates further comprises controlling the speed at which the first spool rotates such that the counteracting twist imparted to the twisted fiber reduces the twist of the twisted fiber to about zero.

* * * * *